United States Patent
Wong et al.

[11] Patent Number: 6,073,178
[45] Date of Patent: Jun. 6, 2000

[54] METHOD AND APPARATUS FOR ASSIGNMENT OF IP ADDRESSES

[75] Inventors: Thomas K. Wong, Pleasanton; Swee B. Lim, Cupertino; Sanjay R. Radia, Fremont; Panagiotis Tsirigotis, Mountain View; Robert J. Goedman, Palo Alto, all of Calif.; Michael W. Patrick, Assonet, Mass.

[73] Assignees: Sun Microsystems, Inc., Palo Alto, Calif.; Motorola, Inc., Schaumburg, Ill.

[21] Appl. No.: 08/762,709

[22] Filed: Dec. 9, 1996

(Under 37 CFR 1.47)

[51] Int. Cl.[7] .................................................. G06F 13/00
[52] U.S. Cl. ...................... 709/229; 709/238; 709/239; 709/240; 709/242; 709/245; 370/474; 370/475
[58] Field of Search .................................... 709/229, 240, 709/242, 245, 238, 239; 370/485, 486, 474, 475

[56] References Cited

U.S. PATENT DOCUMENTS

| | | |
|---|---|---|
| 5,790,548 | 8/1998 | Sistanizadeh et al. . |
| 5,812,819 | 9/1998 | Rodwin et al. . |
| 5,848,233 | 12/1998 | Radia et al. . |
| 5,884,024 | 3/1999 | Lim et al. ................................ 709/240 |

FOREIGN PATENT DOCUMENTS

| | | |
|---|---|---|
| 0 483 547 A1 | 10/1991 | European Pat. Off. . |
| WO96/39769 | 12/1996 | WIPO . |

OTHER PUBLICATIONS

Article by Charles E. Perkins and Kevin Luo, entitled "Using DHCP With Computers That Move," Wireless Networks, vol. 1, No. 3, Oct. 1, 1995, XP000538245, pp. 341–353.

Douglas E. Comer, "Internetworking with TCP/IP, vol. 1: Principles, Protocols, and Architecture," 1995, Prentice Hall International Editions, Chapter 21.9–21.19, New Jersey, XP002063312, pp. 372–380.

Patent abstracts of Japan, vol. 096, No. 011, Nov. 29, 1996 and JP 08 186569 A (Toshiba Corp.), Jul. 16, 1996.

R. Droms, "Dynamic Host Configuration Protocol", RFC 1541, Bucknell University, Oct. 1993.

*Primary Examiner*—Zarni Maung
*Assistant Examiner*—Almari Romero
*Attorney, Agent, or Firm*—O'Melveny & Myers LLP

[57] ABSTRACT

A preferred embodiment of the present invention includes a method and apparatus for allocating and using IP addresses in a network of client systems. More specifically, the present invention includes a router which monitors the assignments of IP addresses by a DHCP server. As each IP address is assigned, the router associates the assigned IP address with an trusted identifier which identifies the client system. Subsequently, if the router received a packet directed at the assigned IP address, the router forwards the packet to the client system having an trusted identifier associated with the destination address of the IP packet. Additionally, if the router receives a packet from a client system, it uses the trusted identifier of the client system to find IP addresses associated with the client system. If the source address of the IP packet is not included in the IP addresses associated with the client system, the packet is discarded.

14 Claims, 6 Drawing Sheets

METHOD AND APPARATUS FOR ASSIGNMENT OF IP ADDRESSES

RELATED APPLICATIONS

The following co-pending patent applications, which were filed on Dec. 9, 1996, are related to the subject application and are herein incorporated by reference:
1. Application Ser. No. 08/763,234, entitled "Method and Apparatus for Client-Sensitive Name Resolution Using DNS" of Swee Boon Lim, Sanjay R. Radia, and Thomas Wong.
2. Application Ser. No. 08/762,393, entitled "Method and Apparatus for Access Control in a Distributed Multiserver Network Environment" of Thomas Wong, Sanjay R. Radia, Swee Boon Lim, Panagiotis Tsirigotis, and Rob Goedman, now U.S. Pat. No. 5,835,727.
3. Application Ser. No. 08/762,402, entitled "Method and Apparatus for Dynamic Packet Filter Assignments" of Sanjay R. Radia, Swee Boon Lim, Panagiotis Tsirigotis, Thomas Wong, and Rob Goedman now U.S. Pat. No. 5,840,233.
4. Application Ser. No. 08/763,289, entitled "Load Balancing and Failover of Network Services" of Swee Boon Lim, Ashish Singhai, and Sanjay R. Radia, now U.S. Pat. No. 5,938,732.
5. Application Ser. No. 08/763,068, entitled "Secure DHCP Server" of Swee Boon Lim, Sanjay R. Radia, Thomas Wong, Panagiotis Tsirigotis, and Rob Goedman, now U.S. Pat. No. 5,884,212.
6. Application Ser. No. 08/763,068, entitled "A Method to Activate Unregistered Systems in a Distributed Multiserver Network Environment" of Thomas Wong and Sanjay R. Radia.
7. Application Ser. No. 08/762,953, entitled "A Method for Using DHCP to Override Learned IP Addresses in a Network" of Sanjay R. Radia, Thomas Wong, Swee Boon Lim, Panagiotis Tsirigotis, Rob Goedman, and Mike Patrick, now U.S. Pat. No. 5,922,049.
8. Application Ser. No. 08/762,705, entitled "Dynamic Cache Preloading Across Loosely Coupled Administrative Domains" of Panagiotis Tsirigotis and Sanjay R. Radia.

The following co-pending patent application is related to the subject application and is herein incorporated by reference:

9. U.S. application Ser. No. 08/673,951, filed Jul. 1, 1996, entitled "A Name Service for a Redundant Array of Internet Servers" of Swee Boon Lim.

FIELD OF THE INVENTION

The present invention relates generally to security in computer networks. More specifically, the present invention is a method and apparatus for assignment of IP addresses that discourages IP address forging.

BACKGROUND OF THE INVENTION

Recent years have witnessed an explosive growth in the use of computer networks. In fact, the use of computer networks to connect disparate computer systems around the world has become a routine and accepted fact. One result of the ever-increasing use of computer networks is an ever-increasing need for security systems.

Computer networks that use the Internet protocol are commonly referred to as "IP networks." Within IP networks, host systems and other objects are identified by thirty-two bit numbers, known as Internet Protocol Addresses (IP addresses). IP addresses provide a simple mechanism for identifying the source and destination of messages sent within IP networks. Unfortunately, several methods exist that allow IP addresses to be falsified, or forged. By forging an IP address, a malicious user may usurp messages within the IP network, possibly gaining access to sensitive information. Forging IP address also allows malicious users to send bogus messages. These messages can easily have a negative impact on network security if a receiving system accepts them as genuine. In a general sense, the possibility that IP addresses may be forged forces systems within IP networks to assume that IP addresses are unreliable.

The unreliability of IP addresses has also discouraged the development and use of programs known as "packet filters." More specifically, packet filters are programs that are positioned at key points within an IP network, such as within network routers. Packet filters examine packets that cross these key points and discard those packets that appear to present a threat to network security.

An example of packet filtering would be a company that uses a router to link its internal intranet with an external network, such as the Internet. In such a network, a packet filter positioned within the router could inspect the header of each received packet to determine the address of the system sending the packet. Clearly, in this case, packets that arrive from the Internet but that have source addresses that correspond to addresses of systems within the company intranet are suspect. A packet filter included in a router would, therefore, discard packets of this type.

The preceding example of a packet filter works well because it assumes that the source address included in a IP packet may be forged. In fact, the example packet filter is designed to detect this type of forged source address. Unfortunately, the unreliability of IP addresses has, to some extent, discouraged a more generalized use of packet filtering systems.

SUMMARY OF THE INVENTION

A preferred embodiment of the present invention includes a method and apparatus for assignment of IP addresses that discourages IP address forging. More specifically, a preferred environment for the present invention is a computer network that includes a series of client systems. Each client system is connected to a corresponding cable modem that is connected, in turn, to a router. An access network control server (ANCS) controls configuration of the router. A services management system (SMS) dynamically reconfigures the ANCS. The network includes one or more DHCP server systems that provide for allocation of IP addresses in accordance with the Dynamic Host Configuration Protocol (DHCP) defined in Internet RFC 1541.

On power-on, each client system requests an IP address by broadcasting a DHCPDISCOVER message to the network using one of the cable modems. The router receives the DHCPDISCOVER message and forwards the DHCPDISCOVER message to the DHCP servers within the network. Before forwarding the DHCPDISCOVER message, however, the router encodes a trusted identifier into the vendor-specific options field of the DHCPDISCOVER message. The trusted identifier is an unforgeable object that positively identifies the client system sending the DHCPDISCOVER message. For a preferred embodiment of the present invention, the trusted identifier is the id of the cable modem from which the DHCPDISCOVER message was received.

In response to the DHCPDISCOVER message, a DHCPACK message is generated by one of the DHCP servers.

The DHCPACK message includes an IP address for the client system and the trusted identifier originally encoded in the DHCPDISCOVER message by the router. The router listens for DHCPACK messages and when, one is received, examines the included IP address and trusted identifier. Using the trusted identifier and the IP address included in the DHCPACK message, the router "learns" the address of each client system requesting an IP address. In this way, the router forms an association between the IP address and the trusted identifier. An IP address associated with a trusted identifier is called a "learned" IP address.

When the router receives a packet directed at a learned IP address, it forwards the packet to the modem that is associated with the learned IP address. This action prevents client systems from usurping IP addresses to gain illicit access to IP packets. Additionally, when the router receives a packet from a modem, it compares the source address included in the packet with the IP addresses that are associated with that modem. If the packet does not originate from an IP address that the router recognizes as being associated with the sending modem, the packet is discarded.

In accordance with the purpose of the invention, as embodied and broadly described herein, the present invention is a method for allocating and using IP addresses in a computer network that includes one or more client systems connected to a router, each client system having an associated trusted identifier, with the router system being able to send IP packets to an individual client system using the trusted identifier associated with the client system, the method comprising the steps, performed by the router, of: detecting a request made by a client system for allocation of an IP address, encoding the trusted identifier associated with the client system in the request, detecting a response to the request from a DHCP server, the response including an IP address allocated to the client system, the response including a copy of the trusted identifier encoded in the request, associating the IP address included in the response with the client system trusted identifier included in the response, and forwarding the response to the client system using the trusted identifier included in the response.

In further accordance with the purpose of the invention, as embodied and broadly described herein, the present invention is a computer program product comprising: a computer usable medium having computer readable code embodied therein for allocating and using IP addresses in a computer network that includes one or more client systems, each client system having an associated trusted identifier, the computer program product comprising: first computer readable program code devices configured to cause a computer system to detect a request made by a client system for allocation of an IP address, second computer readable program code devices configured to cause the computer system to encode the trusted identifier associated with the trusted identifier in the request, and third computer readable program code devices configured to cause the computer system to detect a response to the request from a DHCP server, the response including an IP address allocated to the client system, the response including a copy of the trusted identifier encoded in the request, fourth computer readable program code devices configured to cause the computer system to associate the IP address included in the response with the client system trusted identifier included in the response, and fifth computer readable program code devices configured to cause the computer system to forward the response to the client system using the trusted identifier included in the response.

Advantages of the invention will be set forth, in part, in the description that follows and, in part, will be understood by those skilled in the art from the description or may be learned by practice of the invention. The advantages of the invention will be realized and attained by means of the elements and combinations particularly pointed out in the appended claims and equivalents.

BRIEF DESCRIPTION OF THE DRAWINGS

The accompanying drawings, which are incorporated in and constitute a part of this specification, illustrate several embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. Wherever possible, the same reference numbers will be used throughout the drawings to refer to the same or like parts.

Figure 1:
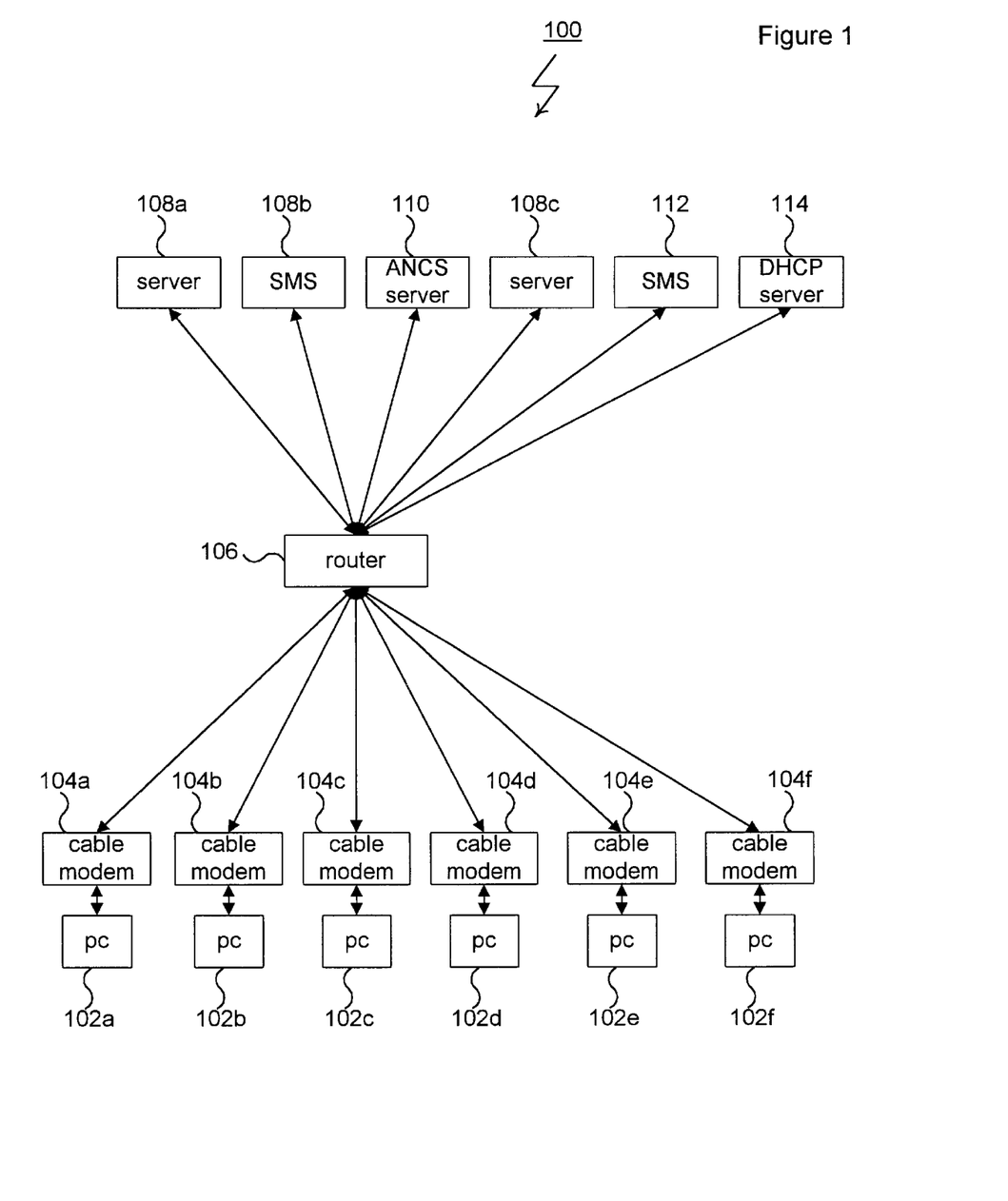
FIG. 1 is a block diagram of a computer network shown as a representative environment for a preferred embodiment of the present invention.

In FIG. 1, a computer network 100 is shown as a representative environment for the present invention. Structurally, computer network 100 includes a series of client systems 102, of which client systems 102a through 102f are representative. Each client system 102 may be selected from a range of differing devices including, but not limited to, the personal computers shown in FIG. 1. A cable modem 104 is connected to each client system 102. Each cable modem 104 is connected, in turn, to a cable router 106. The use of cable router 106 and cable modems 104 is also intended to be exemplary and it should be appreciated that other networking technologies and topologies are equally practical. It should also be appreciated that a number of different cable modems and cable routers are available from various manufactures. In particular, cable modem 104 can be a CyberSUFR cable modem and cable router 106 can be a CableMASTR cable router, both supplied by Motorola, Inc.

Figure 2:
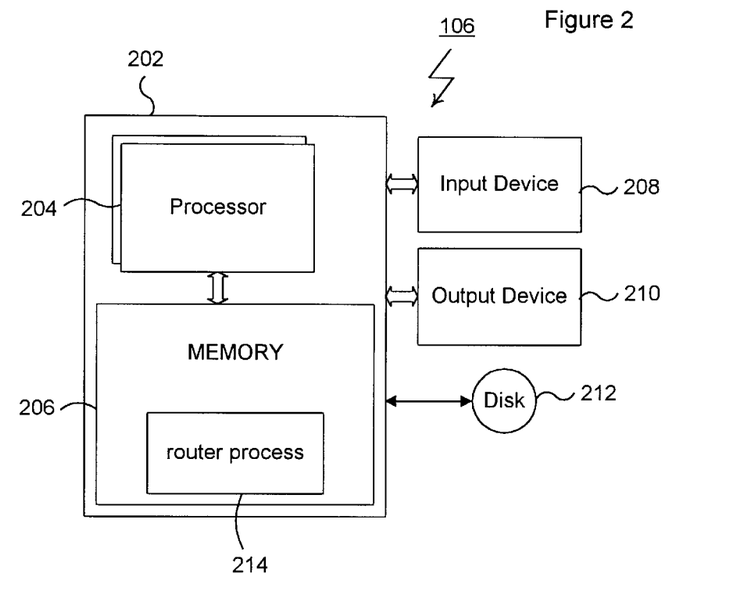
FIG. 2 is a block diagram of a router used by a preferred embodiment of the present invention.

Router 106 is shown in more detail in FIG. 2 to include a computer system 202 that, in turn, includes a processor, or processors 204, and a memory 206. An input device 208 and an output device 210 are connected to the computer system 202 and represent a wide range of varying I/O devices such as disk drives, keyboards, modems, network adapters, printers and displays. A disk drive 212, of any suitable disk drive type, is shown connected to computer system 202. A router management process 214 is shown to be resident in memory 206 of computer system 202.

Computer network 100 also includes a series of server systems 108, of which server systems 108a through 108c are representative. Each server system 108 is connected to cable router 106. Generally, server systems 108 are intended to represent the broad range of server systems that may be found within computer networks.

Figure 3:
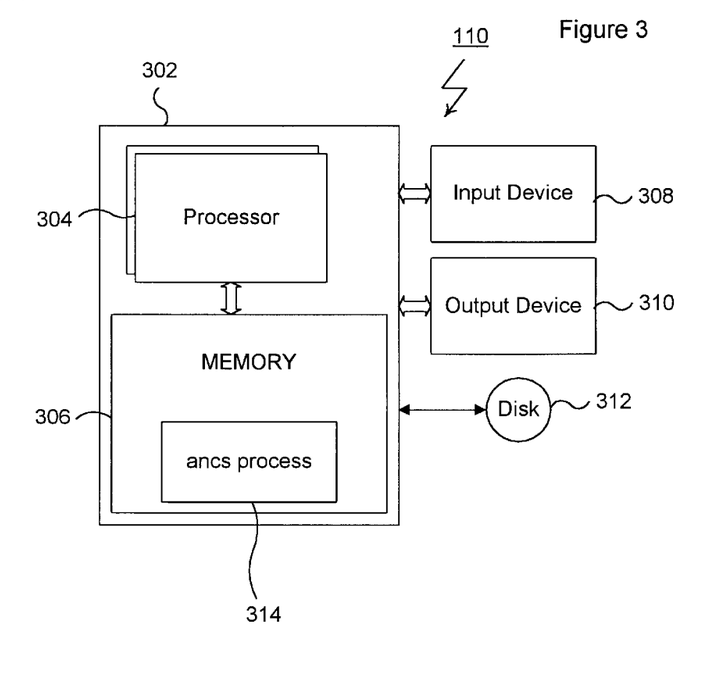
FIG. 3 is a block diagram of an access network control server (ANCS) as used by a preferred embodiment of the present invention.

Computer network 100 also includes an access network control server (ANCS) 110 and a services management system (SMS) 112. Both ANCS 110 and SMS 112 are connected to cable router 106. ANCS 110 is shown in more detail in FIG. 3 to include a computer system 302 that, in turn, includes a processor, or processors 304, and a memory 306. An input device 308 and an output device 310 are connected to the computer system 302 and represent a wide range of varying I/O devices such as disk drives, keyboards, modems, network adapters, printers and displays. A disk drive 312, of any suitable disk drive type, is shown connected to computer system 302. An ANCS process 314 is shown to be resident in memory 306 of computer system 302.

Figure 4:
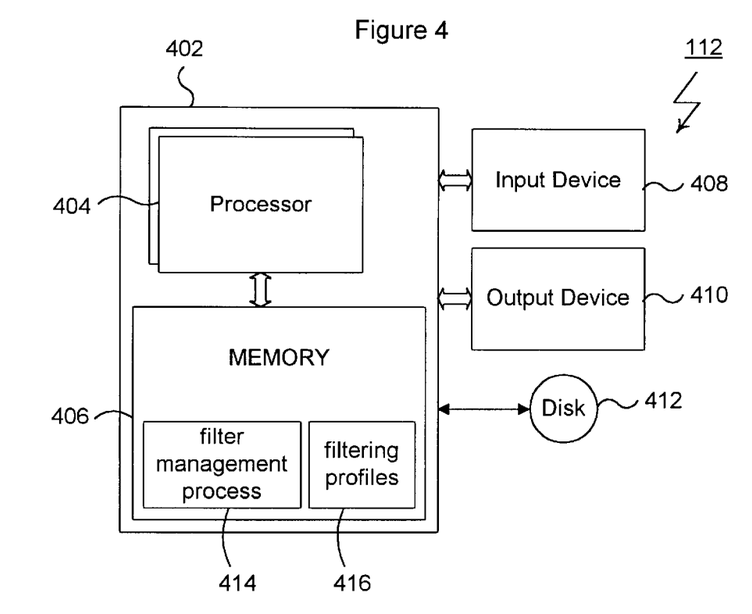
FIG. 4 is a block diagram of an services management system (SMS) as used by a preferred embodiment of the present invention.

SMS 112 is shown in more detail in FIG. 4 to include a computer system 402 that, in turn, includes a processor, or processors 404, and a memory 406. An input device 408 and an output device 410 are connected to the computer system 402 and represent a wide range of varying I/O devices such as disk drives, keyboards, modems, network adapters, printers and displays. A disk drive 412, of any suitable disk drive type, is shown connected to computer system 402. A SMS filter management process 414 and filtering profile database 416 are shown to be resident in memory 406 of computer system 402.

A DHCP server system 114 is also included in computer network 100 and connected to cable router 106. DHCP server system 114 is a computer or other system that implements Dynamic Host Configuration Protocol (DHCP) defined in Internet RFC 1541, which is incorporated herein by reference. Functionally, DHCP server system 114 provides for allocation of IP addresses within network 100. Although FIG. 1 shows only a single DHCP server system 114, it is to be understood that additional DHCP server systems 114 may be used without departing from the spirit of the present invention. It should also be appreciated that the connections between the various components of FIG. 1 are intended to represent logical connections. The actual physical topology used for these connections may vary from what is pictured in FIG. 1.

Figure 5:
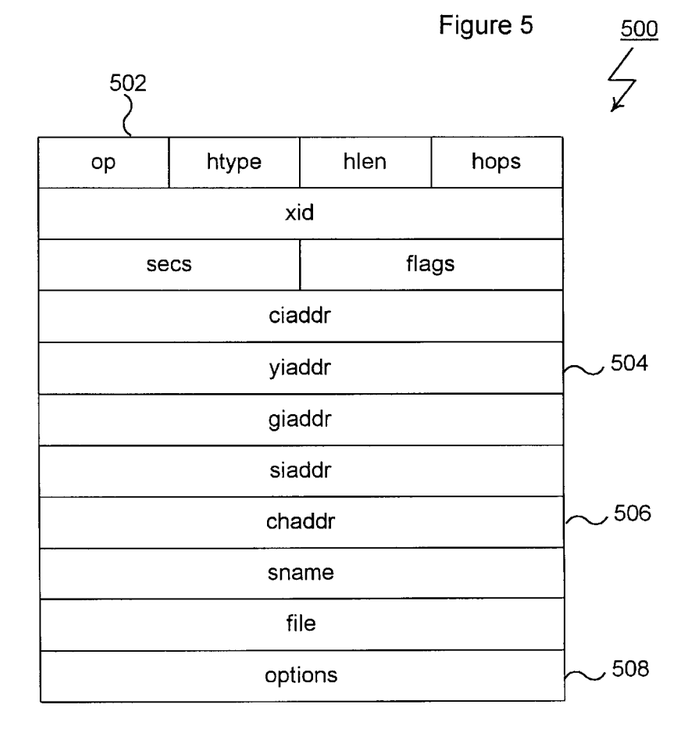
FIG. 5 is a block diagram of a DHCP message used in a preferred embodiment of the present invention.

A preferred format for DCHP messages sent between client systems 102 and DHCP server system 114 is shown in FIG. 5 and generally designated 500. Structurally, a DCHP message includes an op field 502, a yiaddr field 504, a chadddr field 506 and an options field 508 (Examination of FIG. 5 shows that each message also includes a number of other fields. For the sake of brevity, these fields will not be discussed with particularity). Functionally, each DHCP message has a type, such as DHCPDISCOVER, DHCPOFFER, DHCPREQUEST or DHCPACK. The type of each DHCP message is encoded into the options field 508. The options field is also used for a number of other purposes, including the encoding of vendor-specific information. Each DHCP message is marked to indicate whether it is being sent from a client system 102 or a DHCP server system 114. This marking is performed by setting op 502 to BOOTREQUEST, or BOOTREPLY, respectively. Within a message, the yiaddr field 504 includes, for certain types of DHCP messages 500, an IP address being passed from a DHCP server 114 to a client system 102. The chadddr field 506 is used for the machine address of a client system 102 (also known as a "MAC" address).

Figure 6:
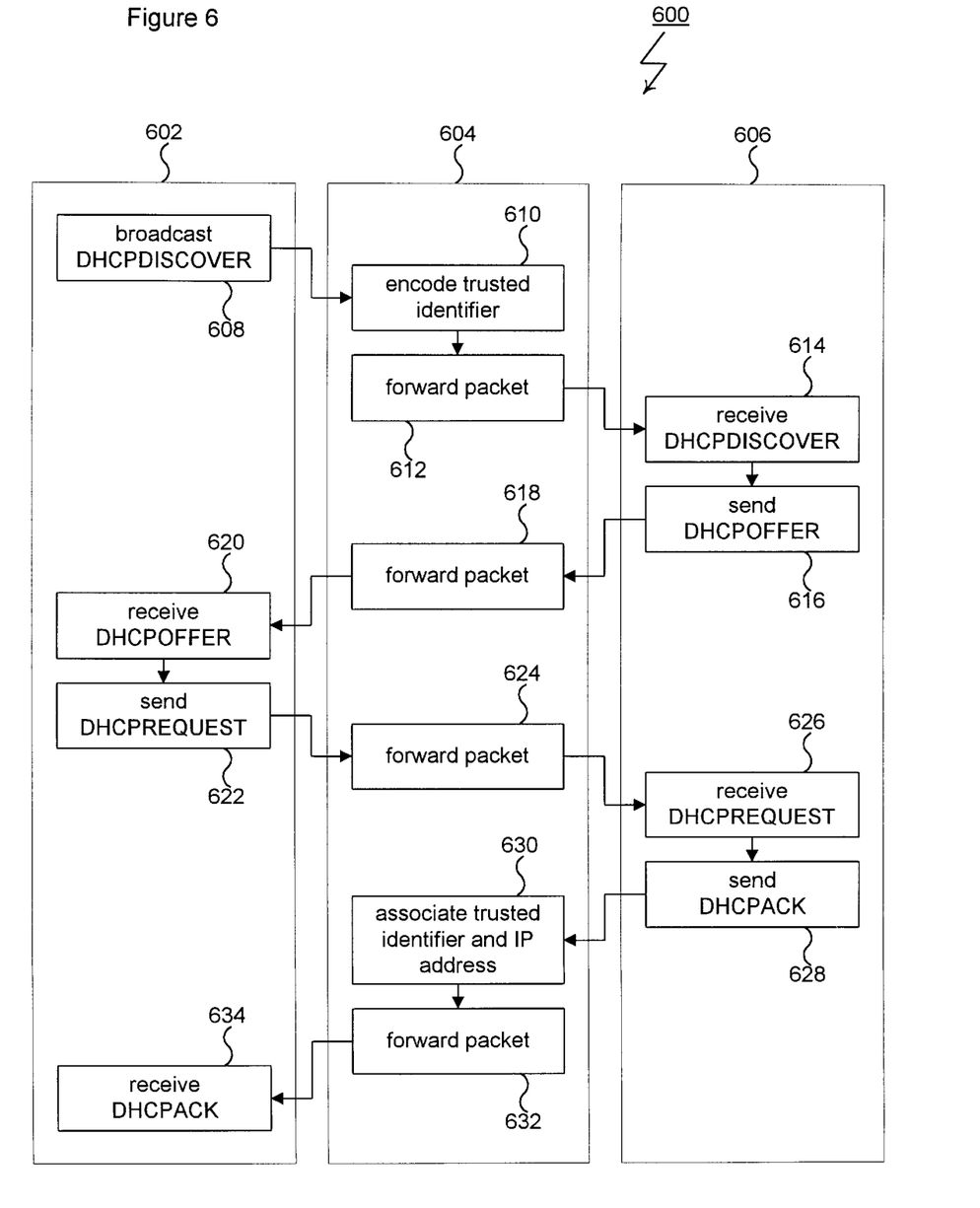
FIG. 6 is a flowchart showing the steps associated with a preferred embodiment of the IP address learning method of the present invention.

In a preferred embodiment of the present invention, router 106 learns IP addresses assigned by DHCP server system 114. A preferred embodiment of this method is shown in FIG. 6 and generally designated 600. Method 600 includes steps performed by a client system 102, steps performed by router 106 and steps performed by DHCP server 114. For convenience, these steps are shown to be included in a client system context 602, a router context 604 and a DHCP server context 606, respectively.

Method 600 begins, in client context 602, with step 608. Step 608 is initiated when a client system 102 powers on or otherwise initially connects to cable router 106. As part of this power-on sequence, the client requests an IP address by broadcasting a DCHPDISCOVER message through cable modem 104 to router 106. Preferably, the DCHPDISCOVER message is constructed in accordance with message format 500 with op 502 set to BOOTREQUEST, chaddr field 506 set to the machine address of the client system 102 and DCHPDISCOVER encoded in options field 508. In step 608, this DCHPDISCOVER message is sent by client system 102 through modem 104 to router 106 for broadcast to all DHCP server systems 114.

In step 610, the DCHPDISCOVER message is received by the router 106. The router 106 recognizes that the received message is a DCHPDISCOVER message. Accordingly, the router 106 encodes a trusted identifier into the vendor-specific information included in the options field 508 of the DCHPDISCOVER message. The trusted identifier is an unforgeable object that positively identifies the client system 102 sending the DHCPDISCOVER message. For a preferred embodiment of the present invention, the trusted identifier is the id of the cable modem 104 from which the DHCPDISCOVER message was received. The id of the cable modem 104 is received by the router 106 when the modem was initialized via message(s) passed between the modem and the router at that time. In step 612, the router 106 broadcasts the DCHPDISCOVER message, now including the trusted identifier, to all DHCP server systems 114.

In step 614, the DCHPDISCOVER message is received from the router 106 by DHCP server system 114. Subsequently, in step 616, the DHCP server system 114 responds to the DCHPDISCOVER message by formulating a DHCPOFFER message. The DHCPOFFER message is preferably constructed using format 500 with op 502 set to BOOTREPLY and DHCPOFFER encoded in the options field 508. The chaddr field 506 and vendor-specific information included in the options field 508 of the DHCPOFFER message are copied from the DCHPDISCOVER message. As a result, the trusted identifier is now included DHCPOFFER message. The DHCPOFFER message is preferably constructed using format 500 with op 502 set to BOOTREPLY and DHCPOFFER encoded in the options field 508. The chaddr field 506 and vendor-specific information included in the options field 508 of the DHCPOFFER message are copied from the DCHPDISCOVER message. As a result, the trusted identifier is now included in the DHCPOFFER message. Additionally, the yiaddr field 504 is set to an IP address that the DHCP server 114 has allocated for the use of the client system 102. In step 616, this DHCPOFFER message is sent by the DHCP server 114 to the router 106

In step 618, the router 106 receives the DHCPOFFER message and forwards the message to the modem 104 for receipt by client system 102. Importantly, the message is forwarded exclusively to the modem identified by the trusted identifier embedded in the vendor-specific options field of the DHCPOFFER message.

In step 620, the DHCPOFFER message is received by the client system 102. The client system 102 may accept the DHCPOFFER message or wait for DHCPOFFER messages from other DHCP servers 114. For the purposes of illustration, however, it is assumed in FIG. 6 that the client system 102 accepts the first DHCPOFFER message received. The client system 102 responds to the DHCPOFFER message by constructing and sending a DHCPREQUEST message to the DHCP server 114. The DHCPOFFER message is constructed using format 500 with op 502 set to BOOTREQUEST and DHCPREQUEST encoded in the options field 508. The chaddr field 506 and vendor-specific information included in the options field 508 of the DHCPREQUEST message are copied from the DHCPOFFER message. As a result, the trusted identifier is now included in the DHCPREQUEST message. In step 622, this DHCPREQUEST message is sent by the client system 102 to the router 106.

In step 624, the router 106 receives the DHCPREQUEST message and forwards the message to the DHCP server 114. In step 626, the DHCP server system 114 receives the DHCPREQUEST message. Subsequently, in step 628, the DHCP server system 114 responds to the DHCPREQUEST message by formulating a DHCPACK message. The DHCPACK message is preferably constructed using format 500 with op 502 set to BOOTREPLY and DHCPACK encoded in the options field 508. The chaddr field 506 and vendor-specific information included in the options field 508 of the DHCPACK message are copied from the DHCPREQUEST message. As a result, the trusted identifier is now included in the DHCPACK message. Additionally, the yiaddr field 504 is, once again, set to the IP address that the DHCP server 114 has allocated for the use of the client system 102. In step 628, the DHCP server 114 sends the DHCPACK message to the router 106.

In step 630, the router 106 receives the DHCPACK message. The router 106 recognizes that the received message is a DHCPACK message. Accordingly, the router 106 extracts the trusted identifier from the vendor-specific information included in the options field 508 of the DHCPACK message. The router 106 also extracts the IP address allocated by the DHCP server 114 from the yiaddr field 504 of the DHCPACK message. The router 106 then forms an association between the extracted trusted identifier and the extracted IP address. This association may be maintained in a list or other suitable data structure within memory 206 of computer system 202. Preferably, the association formed between the extracted trusted identifier and the extracted IP address is two-way. Using the two-way association the router 106 can determine the IP addresses that are associated with a modem 104. The router 106 can also determine which modem 104 is associated with an IP address. Effectively, by forming this association, the router 106 has learned the IP address allocated by the DHCP server 114. In step 632, the router 106 forwards the DHCPACK message to the modem 104 for receipt by client system 102. Importantly, the message is forwarded exclusively to the modem identified by the trusted identifier embedded in the vendor-specific options field of the DHCPACK message.

In step 634, the client system 102 receives the DHCPACK message. The client system 102 then uses the IP addresses included in the yiaddr field 504 of the DHCPACK message as the IP address of the client system 102.

Figure 7:
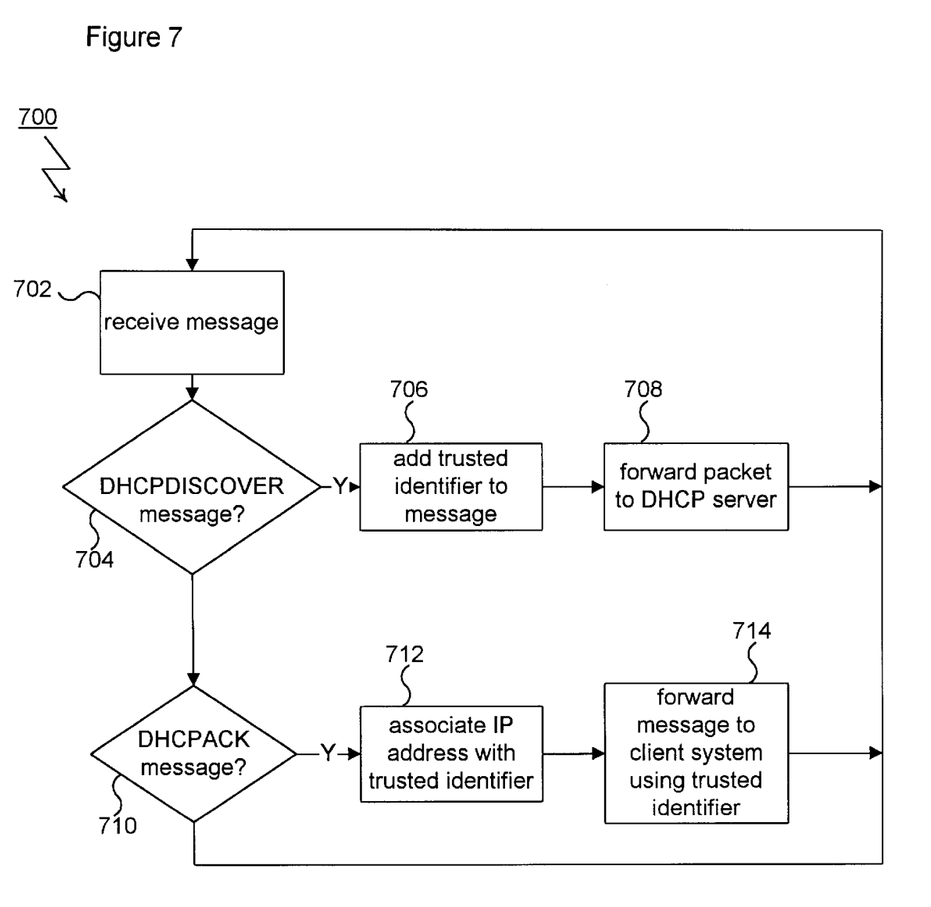
FIG. 7 is a flowchart showing the steps, performed by the router, for a preferred embodiment of the IP address learning method of FIG. 6.

For clarity, the steps performed by the router 106 for a preferred embodiment of the IP address learning method are shown as method 700 of FIG. 7. More specifically, method 700 begins with step 702 where the router 106 receives a message. In step 704 the received message is examined, by the router 106, to determine if the message is a DHCPDISCOVER message. In the affirmative case, execution of method 700 continues at step 706 where the router 106 encodes the trusted identifier of the client system 102 sending the DHCPDISCOVER message into the vendor-specific information included in the options field 508 of the DHCPDISCOVER message. The router 106 then forwards the DHCPDISCOVER message in step 708.

In the alternative case to step 704, (i.e., where the received message is not a DHCPDISCOVER message) execution of method 700 continues at step 710. In step 710, the received message is examined to determine if it is a DHCPACK message. In the affirmative case, execution of method 700 continues at step 712 where the router 106 checks to see if the IP address allocated by the DHCP server has been previously associated with another trusted identifier.

In the positive case (i.e., where the IP address has been previously associated with another trusted identifier) execution of method continues at step 714. In step 714 the router 106 removes the association between the allocated IP address and the other trusted identifier. This prevents a single IP address from being associated with multiple trusted identifiers. Execution of method 700 then continues at step 718 where the router 106 associates the IP address included in the yiaddr field 504 of the DHCPACK message with the trusted identifier included in the vendor-specific information included in the options field 508 of the DHCPACK message. As discussed previously, this association may be performed using any suitable data structure that allows for a two-way association between trusted identifier and IP addresses.

Figure 8:
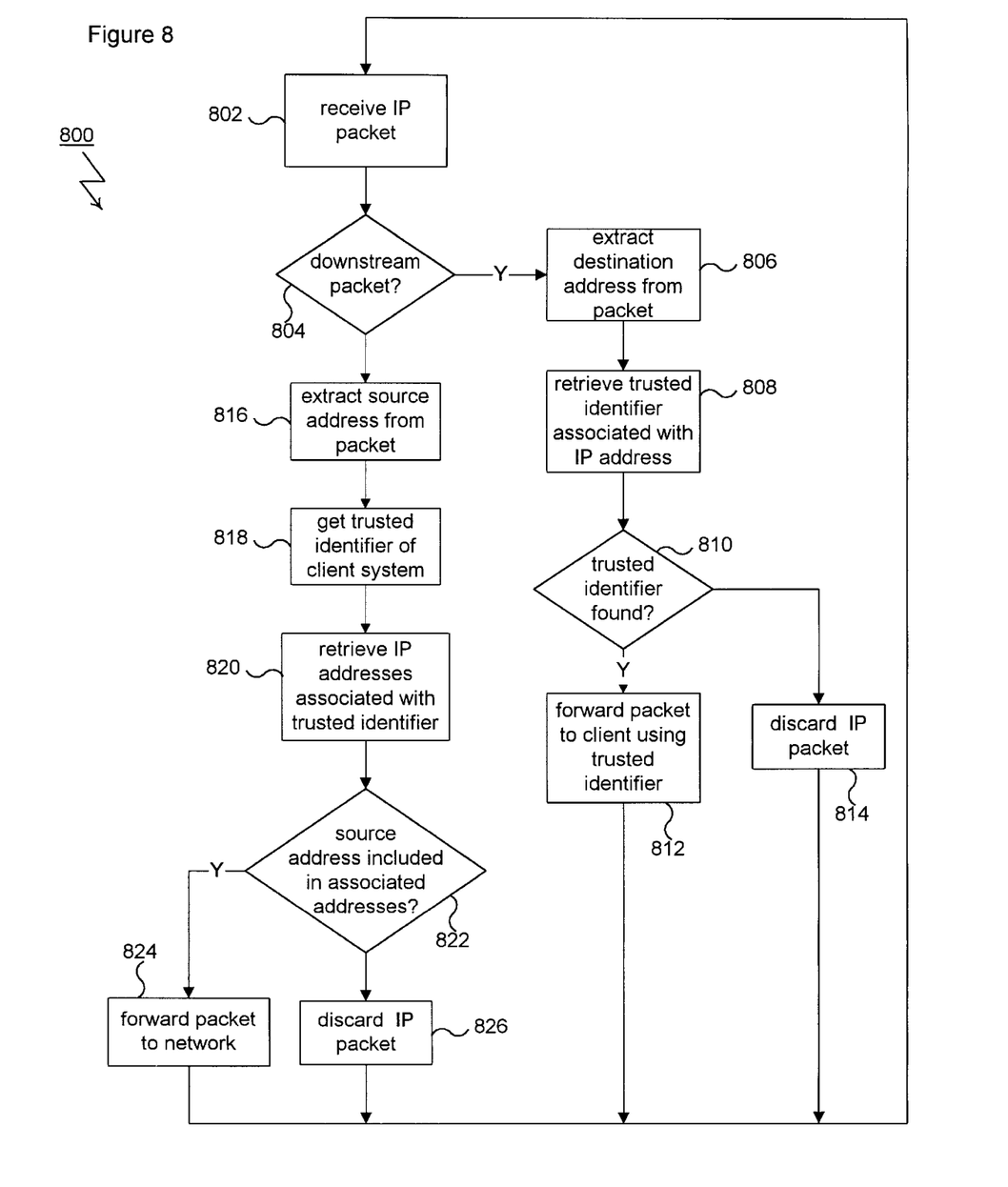
FIG. 8 is a flowchart showing the steps, performed by the router, for a preferred embodiment of the packet forwarding method of the present invention.

A preferred embodiment of the present invention also includes a method using for selectively forwarding, by router 106, of packets based on learned assignments of IP addresses. A preferred embodiment of this method is shown in FIG. 8 and generally designated 800. Method 800 begins with step 802 where an IP packet is received by the router 106. In step 804 that follows, the received IP packet is examined to determined if it is a "downstream packet." Generally, routers categorize packets into "upstream" and "downstream" packets. In the case of the network topology shown for network 100, upstream packets are packets that originate at one of the client systems 102. Downstream packets are packets that are directed at one of the client systems 102.

If a downstream packet is detected in step 804, execution of method 800 continues at step 806 where the router 106 extracts the packet's destination address. Using this destination address, the router 106, in step 808 "looks up" the trusted identifier of the client system 102 that is associated with the destination address of the received packet (this association is formed by the router 106 during execution of method 600). In step 810, a test is performed to ascertain whether a trusted identifier was actually located in step 808. If a trusted identifier was located in step 808, execution of method 800 continues at step 812 where the router 106 forwards the received packet to client system associated with the trusted identifier. In the alternative, if no trusted identifier is associated with the destination address of the packet, the router 106 discards the packet in step 814.

If a downstream packet is not detected in step 804 (i.e., when the packet is an upstream packet), execution of method 800 continues at step 816, where the router 106 extracts the packet's source address. In step 818, the router 106 retrieves the trusted identifier of the client system 102 from which the IP packet was received. In step 820, the router 106 "looks up" the IP addresses that are associated with the trusted identifier retrieved in the previous step. For the purposes of the present invention, these IP addresses are the only IP addresses that are authorized to send packets using the modem 104 from which the packet was received.

In step 822, the router 106 compares the source address of the received packet with the authorized IP addresses that were looked up in step 820. If the source address of the packet matches one of the authorized IP addresses, the router 106 forwards the packet in step 824. Alternatively, if the source address of the received packet does not match one of the authorized IP addresses, the router 106 discards the packet in step 826.

It should be appreciated that the use in the preceding description of the use of cable modems 104 and a cable router 106 with regard to FIGS. 1 through 8 is intended to exemplary. In particular, it should be appreciated that the present invention is specifically intended to be used in combination with a wide range of networking technologies and topologies. The present invention is particularly applicable to networks, like network 100, that provide for an id that is associated with each client system 102 and that allow packets to be sent exclusively to a particular client system 102 using the id of the client system 102.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method for allocating and using IP addresses in a computer network that includes one or more client systems connected to a router, each client system having an associated trusted identifier, with the router system being able to send IP packets to an individual client system using the trusted identifier associated with the client system, the method comprising the steps, performed by the router, of:

detecting a request made by a client system for allocation of an IP address;

encoding the trusted identifier associated with the client system in the request;

detecting a response to the request from a Dynamic Host Configuration Protocol server, the response including an IP address allocated to the client system, the response including a copy of the trusted identifier encoded in the request;

associating the IP address included in the response with the client system trusted identifier included in the response; and forwarding the response to the client system using the trusted identifier included in the response.

2. A method as recited in claim 1 further comprising the steps, performed by the router, of:

receiving an IP packet sent by one of the client systems;

using the trusted identifier of the sending client system to retrieve IP addresses associated with the sending client system;

retrieving a source IP address from the IP packet; and conditionally discarding the IP packet if the source IP address is not included in the IP addresses associated with the sending client system.

3. A method as recited in claim 1 further comprising the steps, performed by the router, of:

receiving an IP packet being sent to one of the client systems;

retrieving a destination IP address from the IP packet;

using the destination IP address to retrieve the trusted identifier of the client system associated with the destination IP address; and forwarding the IP packet to the client system using the retrieved trusted identifier.

4. A method as recited in claim 1 wherein the detected request made by a client system for allocation of an IP address is a DHCPDISCOVER message.

5. A method as recited in claim 4 wherein the step of encoding the trusted identifier associated with the client system, is performed by encoding the trusted identifier in the vendor-specific information of the DHCPDISCOVER message.

6. A method as recited in claim 1 wherein the detected response to the request from a Dynamic Host Configuration Protocol server is a DHCPACK message.

7. A method as recited in claim 1 wherein the router included in the computer network is a cable router and wherein the network includes one or more cable modems with each client system being connected to the to the cable router using one such cable modem and wherein the trusted identifier associated with each client is the modem id of the cable modem to which the client system is connected.

8. A computer program product comprising:

a computer usable medium having computer readable code embodied therein for allocating and using IP addresses in a computer network that includes one or more client systems, each client system having an associated trusted identifier, the computer program product comprising:

first computer readable program code devices configured to cause a computer system to detect a request made by a client system for allocation of an IP address;

second computer readable program code devices configured to cause the computer system to encode the trusted identifier associated with the trusted identifier in the request; and third computer readable program code devices configured to cause the computer system to detect a response to the request from a Dynamic Host Configuration Protocol server, the response including an IP address allocated to the client system, the response including a copy of the trusted identifier encoded in the request;

fourth computer readable program code devices configured to cause the computer system to associate the IP address included in the response with the client system trusted identifier included in the response; and fifth computer readable program code devices configured to cause the computer system to forward the response to the client system using the trusted identifier included in the response.

9. A computer program product as recited in claim 8 which further comprises:

sixth computer readable program code devices configured to cause the computer system to receive IP packets sent by the client systems, each IP packet including a source IP address;

seventh computer readable program code devices configured to cause the computer system to use the trusted identifier of each client system sending IP packets to retrieve IP addresses associated with each client system sending IP packets; and eighth computer readable program code devices configured to cause the computer system to conditionally discard an IP packet if the source IP address included in the IP packet is not included in the IP addresses associated with the client system sending the IP packet.

10. A computer program product as recited in claim 8 which further comprises:

sixth computer readable program code devices configured to cause the computer system to receive IP packets sent to one of the client systems, each IP packet including a destination IP address;

seventh computer readable program code devices configured to cause the computer system to use the destination IP address of each received IP packet to retrieve the trusted identifier of the client system associated with the destination IP address; and eighth computer readable program code devices configured to cause the computer system to forward the received IP packet to the client system associated with the destination IP address.

11. A computer program product as recited in claim 8 wherein the detected request made by a client system for allocation of an IP address is a DHCPDISCOVER message.

12. A computer program product as recited in claim 8 wherein the trusted identifier associated with the client system is encoded in the vendor-specific information of the DHCPDISCOVER message.

13. A computer program product as recited in claim 8 wherein the detected response to the request from a Dynamic Host Configuration Protocol server is a DHCPACK message.

14. An apparatus for allocating and using IP addresses in a computer network that includes one or more client systems connected to a router, each client system having an associated trusted identifier, with the router system being able to send IP packets to an individual client system using the trusted identifier associated with the client system, the method comprising the steps, performed by the router, of:

a first portion configured to cause the router to detect the assignment of an IP addresses to a client system and to associated the IP address assigned to a client system with the trusted identifier of the client system;

a second portion configured to cause the router to accept an IP packet directed at a client system, the accepted IP packet including a destination IP address, the second portion also configured to cause the router to use the destination IP address of the accepted IP packet to retrieve the trusted identifier of the client system associated with the destination IP address and to forward the accepted IP packet to the client system associated with the destination IP address; and a third portion configured to cause the router to accept an IP packet sent from a client system, the accepted IP packet including a source IP address, the third portion also configured to cause the router to use the trusted identifier of the sending client system to retrieve IP addresses associated with the sending client system and to conditionally discard the accepted IP packet if the source IP address included in the accepted IP packet is not included in the IP addresses associated with the sending client system.

* * * * *